US012562368B2

(12) United States Patent
Choi et al.

(10) Patent No.: US 12,562,368 B2
(45) Date of Patent: Feb. 24, 2026

(54) NEGATIVE ELECTRODE AND SECONDARY BATTERY INCLUDING THE NEGATIVE ELECTRODE

(71) Applicant: LG ENERGY SOLUTION, LTD., Seoul (KR)

(72) Inventors: Hee Won Choi, Daejeon (KR); Sang Wook Woo, Daejeon (KR); Suk In Noh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 669 days.

(21) Appl. No.: 17/913,911

(22) PCT Filed: Jul. 6, 2021

(86) PCT No.: PCT/KR2021/008568
§ 371 (c)(1),
(2) Date: Sep. 23, 2022

(87) PCT Pub. No.: WO2022/010225
PCT Pub. Date: Jan. 13, 2022

(65) Prior Publication Data
US 2024/0213441 A1    Jun. 27, 2024

(30) Foreign Application Priority Data
Jul. 7, 2020    (KR) ........................ 10-2020-0083507

(51) Int. Cl.
| | |
|---|---|
| *H01M 4/00* | (2006.01) |
| *H01M 4/133* | (2010.01) |
| *H01M 4/36* | (2006.01) |
| *H01M 4/587* | (2010.01) |
| *H01M 4/62* | (2006.01) |
| *H01M 4/02* | (2006.01) |

(52) U.S. Cl.
CPC ........... *H01M 4/133* (2013.01); *H01M 4/364* (2013.01); *H01M 4/587* (2013.01); *H01M 4/625* (2013.01); *H01M 2004/021* (2013.01); *H01M 2004/027* (2013.01)

(58) Field of Classification Search
CPC .. H01M 10/0525; H01M 4/587; H01M 4/133; H01M 2004/021; H01M 2004/027; Y02E 60/10
See application file for complete search history.

(56) References Cited

U.S. PATENT DOCUMENTS

| | | |
|---|---|---|
| 2006/0073387 A1 | 4/2006 | Sakagoshi et al. |
| 2016/0181612 A1 | 6/2016 | Lee et al. |
| 2018/0190985 A1 | 7/2018 | Choi et al. |
| 2019/0088947 A1 | 3/2019 | Piao et al. |
| 2019/0165373 A1 | 5/2019 | Les et al. |
| 2020/0295351 A1 | 9/2020 | Piao et al. |
| 2020/0365875 A1 | 11/2020 | Choi et al. |
| 2021/0126248 A1 | 4/2021 | Choi et al. |
| 2021/0167398 A1 | 6/2021 | Choi et al. |

FOREIGN PATENT DOCUMENTS

| | | | |
|---|---|---|---|
| CN | 105659417 A | 6/2016 | |
| CN | 107851795 A | 3/2018 | |
| CN | 108383116 A | 8/2018 | |
| CN | 108886137 A | 11/2018 | |
| CN | 109935891 A | 6/2019 | |
| CN | 110649256 A | 1/2020 | |
| CN | 111370654 A | 7/2020 | |
| JP | 9-330735 A | 12/1997 | |
| JP | 2005-294011 A | 10/2005 | |
| JP | 2014-229517 A | 12/2014 | |
| JP | 2015-220173 A | 12/2015 | |
| JP | 2019-179687 A | 10/2019 | |
| KR | 10-2005-0094451 A | 9/2005 | |
| KR | 10-2014-0128307 A | 11/2014 | |
| KR | 10-2015-0070971 A | 6/2015 | |
| KR | 10-2017-0037100 A | 4/2017 | |
| KR | 10-2018-0029919 A | 3/2018 | |
| KR | 10-2018-0033800 A | 4/2018 | |
| KR | 20190062319 A | * 11/2018 | ........ H01M 10/0525 |
| KR | 10-2019-0062319 A | 6/2019 | |
| KR | 10-2019-0108883 A | 9/2019 | |
| KR | 10-2019-0115834 A | 10/2019 | |
| KR | 10-2020-0019005 A | 2/2020 | |
| KR | 10-2020-0044703 A | 4/2020 | |
| WO | WO 2017/111542 A1 | 6/2017 | |
| WO | WO 2020/036392 A1 | 2/2020 | |

OTHER PUBLICATIONS

Chung et al., Negative Electrode Active Material, Negative Electrode and Lithium Secondary Battery Comprising the Same, Jun. 2019, See the Abstract. (Year: 2019).*
International Search Report for PCT/KR2021/008568 mailed on Oct. 12, 2021.
Extended European Search Report for European Application No. 21838888.2, dated Jul. 25, 2023.

* cited by examiner

*Primary Examiner* — Tiffany Legette
*Assistant Examiner* — Monique M Wills
(74) *Attorney, Agent, or Firm* — Birch, Stewart, Kolasch & Birch, LLP

(57) ABSTRACT

A negative electrode whose rapid charging performance and lifetime characteristics are excellent and a secondary battery including the negative electrode. The negative electrode includes a current collector and a negative electrode active material layer on the current collector. The negative electrode active material layer includes a negative electrode active material, and the negative electrode active material includes first uncoated artificial graphite particles and second uncoated artificial graphite particles in a weight ratio of 4:6 to 6:4. The first uncoated artificial graphite particles are single particles having an average particle diameter ($D_{50}$) of 5 μm to 7 μm, and the second uncoated artificial graphite particles are secondary particles formed by agglomerating a plurality of primary particles. The second uncoated artificial graphite particles have an average particle diameter ($D_{50}$) of 20 μm to 25 μm.

11 Claims, No Drawings

NEGATIVE ELECTRODE AND SECONDARY BATTERY INCLUDING THE NEGATIVE ELECTRODE

TECHNICAL FIELD

Cross-Reference to Related Application

This application claims priority to and the benefit of Korean Patent Application No. 10-2020-0083507, filed on Jul. 7, 2020, the disclosure of which is incorporated herein by reference in its entirety.

Technical Field

The present invention relates to a negative electrode whose rapid charging performance and lifetime characteristics are excellent and a secondary battery including the negative electrode, and specifically, to a negative electrode including a negative electrode active material including both uncoated artificial graphite particles which are single particles and uncoated artificial graphite particles which are secondary particles formed by agglomerating a plurality of primary particles, and a secondary battery including the negative electrode.

BACKGROUND ART

With a dramatic increase in the use of fossil fuels, there is an increasing demand for use of alternative energy or clean energy, and power generation and accumulation fields using electrochemical reactions have been most actively studied to meet the increasing demand.

A representative example of the electrochemical device using electrochemical energy comprises secondary batteries, and an application area thereof is gradually expanding. Recently, as technology development and demand for portable devices such as portable computers, mobile phones, cameras, and the like increase, demand for secondary batteries as energy sources is sharply increasing. Also, to improve convenience in use of a secondary battery, a reduction in charging time is required, and accordingly, excellent rapid charging performance is required.

A secondary battery generally consists of a positive electrode, a negative electrode, an electrolyte injected into the secondary battery, and a separator. The negative electrode comprises a negative electrode active material that allows lithium ions released from the positive electrode to be intercalated and deintercalated.

As the negative electrode active material, a graphite-based active material, for example, natural graphite, artificial graphite, or the like, is commonly used. Conventionally used natural graphite is advantageous in that it is inexpensive and has excellent cost-effectiveness, but has a problem such as the occurrence of an irreversible reaction caused by the penetration or decomposition of an electrolyte solution when applied to a battery due to its irregular structure. Also, conventionally used artificial graphite is advantageous in that it exhibits excellent initial charge/discharge efficiency, but has a problem in that it exhibits lower discharge capacity than that of natural graphite, thereby degrading battery capacity and energy density.

In order to solve the above problems, a negative electrode active material made by mixing typical natural graphite and artificial graphite, a negative electrode active material in which an amorphous carbon coating layer is formed on typical natural graphite or artificial graphite, and the like have been conventionally used. However, in this case, rapid charging performance and lifetime characteristics at room temperature are degraded.

Therefore, there is a demand for a negative electrode including a negative electrode material capable of realizing a secondary battery which has high energy density and is excellent in rapid charging performance and lifetime characteristics.

RELATED-ART DOCUMENTS

Patent Documents

Japanese Laid-Open Patent Publication No. 2019-179687

DETAILED DESCRIPTION OF THE INVENTION

Technical Problem

The present invention is directed to providing a negative electrode having high energy density, excellent rapid charging performance, and excellent lifetime characteristics and a secondary battery including the negative electrode.

Technical Solution

One aspect of the present invention provides a negative electrode which comprises a current collector and a negative electrode active material layer on the current collector, wherein the negative electrode active material layer comprises a negative electrode active material, the negative electrode active material comprises first uncoated artificial graphite particles and second uncoated artificial graphite particles in a weight ratio of 4:6 to 6:4, the first uncoated artificial graphite particles are single particles having an average particle diameter ($D_{50}$) of 5 μm to 7 μm, and the second uncoated artificial graphite particles are secondary particles formed by agglomerating a plurality of primary particles and the second uncoated artificial graphite particles have an average particle diameter ($D_{50}$) of 20 μm to 25 μm.

Another aspect of the present invention provides a secondary battery including the negative electrode.

Advantageous Effects

According to the present invention, since a negative electrode comprises a negative electrode active material including first uncoated artificial graphite particles which are single particles having an average particle diameter ($D_{50}$) of 5 μm to 7 μm and second uncoated artificial graphite particles which are secondary particles formed by agglomerating a plurality of primary particles and having an average particle diameter ($D_{50}$) of 20 μm to 25 μm in a specific weight ratio, the single particles can fill up the empty space of the secondary particles to reduce voids, the single particle, which is soft, can absorb shock between the secondary particles to allow the electrode to be relatively less physically damaged and structurally changed when roll-pressed, and the electrode can be smoothly roll-pressed to achieve a thin electrode and eventually a thin battery, thereby improving the energy density of a battery. Also, the rapid charging performance and lifetime characteristics of a battery can be improved.

Modes of the Invention

Hereinafter, the present invention will be described in more detail to facilitate understanding of the present invention.

Terms and words used in the specification and the claims should not be interpreted as limited to commonly used meanings or meanings in dictionaries and should be interpreted with meanings and concepts which are consistent with the technological scope of the present invention based on the principle that the inventors can appropriately define concepts of terms in order to describe the invention in the best way.

The terminology used in the specification is merely used for the purpose of describing exemplary embodiments, and is not intended to be limiting of the present invention. The singular forms "a," "an," and "the" are intended to include the plural forms as well, unless the context clearly indicates otherwise.

It should be understood that the terms "comprises," "comprising," "comprises," "including." "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the specification, $D_{50}$ may be defined as a particle diameter corresponding to 50% of the cumulative volume in a particle size distribution curve (curve on the graph of a particle size distribution). The $D_{50}$ may be measured, for example, using a laser diffraction method. The laser diffraction method generally allows the measurement of a particle diameter ranging from a submicron level to several millimeters and may produce a result having high reproducibility and high resolution.

<Negative Electrode>

A negative electrode according to an embodiment of the present invention comprises a current collector and a negative electrode active material layer formed on the current collector, wherein the negative electrode active material layer comprises a negative electrode active material, the negative electrode active material comprises first uncoated artificial graphite particles and second uncoated artificial graphite particles in a weight ratio of 4:6 to 6:4, the first uncoated artificial graphite particles are single particles having an average particle diameter ($D_{50}$) of 5 μm to 7 μm, and the second uncoated artificial graphite particles are secondary particles formed by agglomerating a plurality of primary particles and having an average particle diameter ($D_{50}$) of 20 μm to 25 μm.

In the specification, a "primary particle" means a single particle, and a "secondary particle" means an agglomerate formed by agglomerating a plurality of the primary particles through a deliberate assembly or bonding process.

The negative electrode comprises a current collector and a negative electrode active material layer formed on the current collector.

The current collector serves to support the negative electrode active material layer.

The current collector is not particularly limited as long as it does not cause a chemical change in the battery and has conductivity. For example, copper, stainless steel, aluminum, nickel, titanium, calcined carbon, aluminum or stainless steel whose surface has been treated with carbon, nickel, titanium, silver, or the like, or the like may be used as the current collector. Specifically, a transition metal that easily adsorbs carbon, such as copper or nickel, may be used as the current collector. The current collector may have a thickness of 6 μm to 20 μm, but the thickness of the current collector is not limited thereto.

The negative electrode active material layer is formed on the current collector. The negative electrode active material layer may be disposed on at least one surface of the current collector, specifically, on one surface or both surfaces of the current collector.

The negative electrode active material layer comprises a negative electrode active material. The negative electrode active material layer may further include a conductive material, a binder, and the like.

The negative electrode active material may include first uncoated artificial graphite particles and second uncoated artificial graphite particles. Specifically, the negative electrode active material may consist of first uncoated artificial graphite particles and second uncoated artificial graphite particles. That is, the negative electrode active material may consist only of the first uncoated artificial graphite particles and the second uncoated artificial graphite particles.

In the specification, an uncoated artificial graphite particle means an artificial graphite particle that has been not coated and means that the entire surface of the artificial graphite is exposed.

Since the negative electrode active material is not cracked, that is, less physically damaged, when roll-pressed by including only an uncoated active material, the structure of a negative electrode can be maintained well.

Since the negative electrode active material comprises single particles and secondary particles, which have specific sizes, in a specific weight ratio, roll-pressing may smoothly proceed in the production of a negative electrode to not only reduce the thickness of a negative electrode and eventually the thickness of a battery but also achieve a battery having high energy density, and the rapid charging performance and lifetime characteristics of a battery may also be improved.

The first uncoated artificial graphite particles may be single particles having an average particle diameter ($D_{50}$) of 5 μm to 7 μm. When the average particle diameter ($D_{50}$) of the single particles is less than 5 μm, an increase in specific surface area of the active material and a decrease in capacity may be caused due to the excessively small particle diameter, and when the average particle diameter ($D_{50}$) of the single particles exceeds 7 μm, the particle diameter is too large to densely fill up the empty space of the secondary particles, and thus rolling performance may be degraded.

The second uncoated artificial graphite particles may be secondary particles having an average particle diameter ($D_{50}$) of 20 μm to 25 μm. When the average particle diameter ($D_{50}$) of the secondary particles is less than 20 μm, the specific surface area of the active material increases, and thus high-temperature performance may be degraded, and when the average particle diameter ($D_{50}$) of the secondary particles exceeds 25 μm, battery performance such as rapid charging and output may be degraded. The secondary particles may specifically have an average particle diameter ($D_{50}$) of 21 μm to 24 μm, and more specifically, 22 μm to 23 μm. When the average particle diameter of the secondary particles falls within the above-described range, the secondary particles can be blended with the single particles in an appropriate range to maximize the rolling performance of the electrode.

The second uncoated artificial graphite particles are secondary particles formed by agglomerating a plurality of primary particles, and the primary particles constituting the secondary particle may have an average particle diameter ($D_{50}$) of 7 μm to 9 μm. When the average particle diameter ($D_{50}$) of the primary particles constituting the second uncoated artificial graphite particle falls within the above-described range, sufficiently high capacity and a high level of battery performance such as rapid charging and output can be maintained due to the appropriate primary particle size.

In the second uncoated artificial graphite particles, a ratio of the average particle diameter ($D_{50}$) of the primary particles constituting the secondary particle and the average particle diameter ($D_{50}$) of the secondary particles formed by agglomerating a plurality of primary particles may be 1:2 to 1.5, and specifically, 1:2 to 1:3 in view of improving energy density and charging performance.

A ratio of the average particle diameter ($D_{50}$) of the first uncoated artificial graphite particles and the average particle diameter ($D_{50}$) of the second uncoated artificial graphite particles may be 1:3 to 1:5, specifically 1:3 to 1:4.5, and more specifically 1:3 to 1:4. When the ratio of the average particle diameter ($D_{50}$) of the first uncoated artificial graphite particles and the average particle diameter ($D_{50}$) of the second uncoated artificial graphite particles falls within the above-described range, the first uncoated artificial graphite particles can fill up the voids of the second uncoated artificial graphite particles to prepare a high-density negative electrode active material, and thus the rapid charging performance and/or lifetime characteristics of a battery can be improved.

A nip pressure when the negative electrode active material is roll-pressed in a tandem manner may be 8 Ton/cm or less, specifically 4 Ton/cm to 8 Ton/cm, and specifically 4 Ton/cm to 6 Ton/cm. In the present invention, a nip pressure in roll-pressing in a tandem manner is measured by a physical roll-pressing method after coating a negative electrode that has not been roll-pressed and drying the same under vacuum. A case where the nip pressure when the negative electrode active material is roll-pressed in a tandem manner falls within the above-described range can be advantageous for receiving less physical force during roll-pressing for production of an electrode and achieving a thin electrode. The nip pressure in roll-pressing in a tandem manner may be measured in a roll press machine equipped with a nip pressure sensor.

The negative electrode active material may have a tap density ranging from 1.00 g/cc to 1.20 g/cc, and specifically, 1.14 g/cc to 1.18 g/cc. When the tap density of the negative electrode active material falls within the above-described range, electrode coating with a low thickness can be made due to the sufficiently high tap density.

The tap density is a mass per volume of powder consisting of particles and refers to a density in which voids between particles are filled by constant tapping or vibration. Factors affecting the tap density include particle size distribution, moisture content, particle shape, cohesiveness, and the like. The fluidity and compressibility of a material may be predicted through the tap density. The tap density may be measured based on ASTM D4781 and may be calculated using the equation TD=W/V (TD: tap density, W: sample weight (g), V: sample volume after tapping).

The negative electrode active material may have a BET specific surface area ranging from 1.0 m$^2$/g to 2.5 m$^2$/g. The negative electrode active material may specifically have a BET specific surface area of 1.4 m$^2$/g to 2.0 m$^2$/g, and more specifically, 1.5 m$^2$/g to 1.9 m$^2$/g. The BET specific surface area may be measured using a BEL Sorption instrument (BEL Japan Inc.). When the BET specific surface area of the negative electrode active material falls within the above-described range, high-temperature performance can be maintained at a high level.

The negative electrode active material layer may have a pore volume ranging from 10 cm$^3$/g to 20 cm$^3$/g. The negative electrode active material layer may specifically have a pore volume of 10 cm$^3$/g to 15 cm$^3$/g, and more specifically, 15 cm$^3$/g to 20 cm$^3$/g. When the pore volume of the negative electrode active material layer falls within the above-described range, high-temperature battery performance such as high-temperature cycle characteristics, high-temperature storage, and the like can be maintained at high levels.

The negative electrode active material may be present in an amount of 90 wt % to 99 wt %, and specifically, 92 wt % to 97 wt % in the negative electrode active material layer. When the content of the negative electrode active material falls within the above-described range, desired battery capacity can be achieved.

The first uncoated artificial graphite particles may be prepared by mixing coke and a binder pitch and thermally treating (i.e., graphitizing) the mixture at a high temperature. The coke may be needle coke and/or isotropic coke, and the coke and the binder pitch may be mixed in a weight ratio of 80:20 to 95:5.

The second uncoated artificial graphite particles may be prepared by mixing coke and a binder pitch, thermally treating the mixture at a high temperature to prepare primary particles, mixing the primary particles with a binder pitch, and thermally treating the mixture at a high temperature, specifically, at 2,500° C. to 3,200° C. Since the binder pitch is graphitized by the thermal treatment at a high temperature, it is possible to prepare second uncoated artificial graphite particles in which a coating material such as amorphous carbon and the like is not present. The coke may be needle coke and/or isotropic coke, the coke and the binder pitch may be mixed in a weight ratio of 80:20 to 95:5, and the primary particles and the binder pitch may be mixed in a weight ratio of 80:20 to 95:5.

The conductive material is not particularly limited as long as it does not cause a chemical change in the battery and has conductivity. For example, graphite such as natural graphite, artificial graphite, or the like; carbon black such as acetylene black, Ketjen black, channel black, furnace black, lamp black, thermal black, or the like; a conductive fiber such as carbon fiber, metal fiber, or the like; a conductive tube such as carbon nanotubes or the like; fluorocarbon; metal powder such as aluminum powder, nickel powder, or the like; a conductive whisker such as zinc oxide, potassium titanate, or the like; a conductive metal oxide such as titanium oxide or the like; or a conductive material such as a polyphenylene derivative or the like may be used as the conductive material.

The conductive material preferably comprises at least one selected from among carbon black and carbon nanotubes and more preferably comprises carbon nanotubes.

The conductive material may be present in an amount of 0.1 wt % to 1.0 wt %, and specifically, 0.3 wt % to 0.7 wt % in the negative electrode active material layer. A case where the content of the conductive material satisfies the above-described range can be advantageous for maintaining a sufficient electric contact and preventing degradation of capacity.

The binder may include at least one selected from the group consisting of a polyvinylidene fluoride-hexafluoropropylene copolymer (PVDF-co-HFP), polyvinylidene fluoride, polyacrylonitrile, polymethyl methacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluoro-rubber, polyacrylic acid, and materials in which hydrogens thereof have been substituted with Li, Na, Ca, or the like, and also include various copolymers thereof.

The binder may be present in an amount of 30 wt % or less, and specifically, 0.1 wt % to 30 wt % in the negative electrode active material layer. When the content of the binder satisfies the above-described range, an adhesive effect resulting from the use of the binder can be exhibited, and desired capacity per volume of a negative electrode can be maintained.

The negative electrode may have a pore resistance of 9 ohm or less by including the negative electrode active material including the first uncoated artificial graphite particles which are single particles having an average particle diameter ($D_{50}$) of 5 μm to 7 μm and the second uncoated artificial graphite particles which are secondary particles formed by agglomerating a plurality of primary particles and having an average particle diameter ($D_{50}$) of 20 μm to 25 μm in a specific weight ratio. The negative electrode preferably has a pore resistance of 6 ohm to 9 ohm. When the pore resistance of the negative electrode falls within the above-described range, a pore resistance in an electrolyte solution can be minimized, and a lithium ion diffusion route can be minimized.

The pore resistance may be defined as a resistance value obtained by injecting a lithium ion-containing electrolyte solution into a symmetric cell produced using the negative electrode for a lithium secondary battery as both a working electrode and a counter electrode and then performing electrochemical impedance spectroscopy (EIS) analysis. Since the pore resistance is measured by the EIS analysis of a symmetric cell, only lithium ions derived from the electrolyte solution may be present, and accordingly, resistance to lithium ion diffusion in a negative electrode may be objectively measured.

<Secondary Battery>

A secondary battery according to another embodiment of the present invention comprises a negative electrode, and the negative electrode is the same as the above-described negative electrode.

Specifically, the secondary battery may include: the above-described negative electrode; a positive electrode; a separator interposed between the negative electrode and the positive electrode; and an electrolyte, and the negative electrode is the same as the above-described negative electrode. Since the negative electrode has been described above, detailed descriptions thereof will be omitted.

The positive electrode comprises a positive electrode current collector and a positive electrode active material layer on the current collector, wherein the positive electrode active material layer comprises a positive electrode active material, and the positive electrode active material may be a layered compound such as a lithium cobalt oxide (LiCoO$_2$), a lithium nickel oxide (LiNiO$_2$), or the like or a compound substituted with one or more transition metals; a lithium iron oxide such as LiFe$_3$O$_4$; a lithium manganese oxide such as Li$_{1+c1}$Mn$_{2-c1}$O$_4$ (0≤c1≤0.33), LiMnO$_3$, LiMn$_2$O$_3$, LiMnO$_2$, or the like; a lithium copper oxide (Li$_2$CuO$_2$); a vanadium oxide such as LiV$_3$O$_8$, V$_2$O$_5$, Cu$_2$V$_2$O$_7$, or the like; a Ni-site-type lithium nickel oxide represented by the chemical formula LiNi$_{1-c2}$M$_{c2}$O$_2$ (here, M is at least one selected from the group consisting of Co, Mn, Al, Cu, Fe, Mg, B, and Ga, and 0.01≤c2≤0.3 is satisfied); a lithium manganese composite oxide represented by the chemical formula LiMn$_{2-c3}$M$_{c3}$O$_2$ (here, M is at least one selected from the group consisting of Co, Ni, Fe, Cr, Zn, and Ta, and 0.01≤c3≤0.1 is satisfied) or LizMn$_3$MO$_8$ (here, M is at least one selected from the group consisting of Fe, Co, Ni, Cu, and Zn); or LiMn$_2$O$_4$ in which some Li ions in the chemical formula have been substituted with alkaline earth metal ions.

The positive electrode active material is preferably one or more selected from among a lithium cobalt oxide, a lithium nickel oxide, and Li$_a$Ni$_{x1}$Co$_{y1}$Mn$_{z1}$O$_2$ (0.9≤a≤1.1, 0.6≤x1<1.0, 0<y1<0.4, 0<z1<0.4).

In the positive electrode, the positive electrode current collector is not particularly limited as long as it does not cause a chemical change in the battery and has conductivity. For example, stainless steel, aluminum, nickel, titanium, calcined carbon, or aluminum or stainless steel whose surface has been treated with carbon, nickel, titanium, silver, or the like may be used as the positive electrode current collector. In addition, the positive electrode current collector may typically have a thickness of 3 μm to 500 μm and have fine irregularities formed on the surface thereof to increase the adhesion of a positive electrode active material. Additionally, the positive electrode current collector may be used in any of various forms such as a film, a sheet, a foil, a net, a porous material, a foam, a non-woven fabric, and the like.

The positive electrode active material layer may include a positive electrode conductive material and a positive electrode binder in addition to the above-described positive electrode active material.

In this case, the positive electrode conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof.

In addition, the positive electrode binder serves to improve cohesion between positive electrode active material particles and adhesion between the positive electrode active material and the positive electrode current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated EPDM, styrene butadiene rubber (SBR), fluoro-rubber, and various copolymers thereof, which may be used alone or in combination of two or more thereof.

The separator serves to separate the negative electrode and the positive electrode and provide a passage through which lithium ions migrate, and any separator typically used as a separator in a secondary battery may be used without particular limitation. In particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. Alternatively, a typical porous non-woven fabric, for example, a non-woven fabric made of high-melting-point glass fiber, polyethylene terephthalate fiber, or the like may be used. Alternatively, a coated separator including a ceramic component or a polymer material to ensure heat resistance or mechanical strength may be used, and optionally, the separator may be used in a single-layer or multi-layer structure.

Examples of the electrolyte include an organic liquid electrolyte, an inorganic liquid electrolyte, a solid polymer electrolyte, a gel-type polymer electrolyte, an inorganic solid electrolyte, a molten-type inorganic electrolyte, and the like, which are usable in the production of a lithium secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate, or the like may be used.

Among the carbonate-based organic solvents, especially, ethylene carbonate and propylene carbonate, which are cyclic carbonates, are preferably used because they are high-viscosity organic solvents and have high permittivity, thereby satisfactorily dissociating a lithium salt. When a mixture formed by mixing such cyclic carbonates with low-viscosity, low-permittivity linear carbonates such as dimethyl carbonate and diethyl carbonate in an appropriate ratio is used, an electrolyte having high electrical conductivity may be prepared. Therefore, the mixture is more preferably used.

As the metal salt, a lithium salt may be used, and the lithium salt is a substance that is easy to dissolve in the non-aqueous electrolyte solution. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In addition to the above-described electrolyte components, the electrolyte may further include one or more additives selected from among a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, and the like.

According to still another embodiment of the present invention, a battery module including the above-described secondary battery as a unit cell and a battery pack including the same are provided. Since the battery module and the battery pack include the secondary battery having high capacity, high rate characteristics, and cycle characteristics, they may be used as power sources of medium-to-large-sized devices selected from the group consisting of electric vehicles, hybrid electric vehicles, and plug-in hybrid electric vehicles, and a power storage system.

Hereinafter, exemplary embodiments of the present invention will be described to facilitate understanding of the present invention. However, it is apparent to those skilled in the art that the exemplary embodiments proposed herein are intended to illustrate the present invention, and various changes and modifications can be made within the scope and technical spirit of the present invention, so it goes without saying that the present invention covers all such changes and modifications provided they are within the scope of the appended claims.

EXAMPLES AND COMPARATIVE EXAMPLES

Example 1: Preparation of Negative Electrode

First uncoated artificial graphite particles which are single particles having an average particle diameter ($D_{50}$) of 6 μm were prepared. Second uncoated artificial graphite particles consisting of secondary particles (average particle diameter ($D_{50}$): 22.5 μm) formed by agglomerating a plurality of primary particles (average particle diameter ($D_{50}$): 8 μm) were prepared.

Specifically, the second uncoated artificial graphite particles were prepared by pulverizing a coke raw material into coke with an average particle diameter ($D_{50}$) of 8 μm; mixing the pulverized coke and pitch to prepare an intermediate granulated in the form of a secondary particle; thermally treating the intermediate to induce graphitization and secondary granulation by slowly raising a temperature to 3,000° C., maintaining the temperature of 3,000° C. for 60 hours, and slowly lowering the temperature to room temperature; and adjusting an average particle diameter ($D_{50}$) of the secondary particles to 22.5 μm. In this case, the total thermal treatment time of the intermediate was 2 weeks.

The first uncoated artificial graphite particles and the second uncoated artificial graphite particles were mixed in a weight ratio of 5:5, and the mixture as a negative electrode active material (BET specific surface area: 1.5 $m^2/g$), styrene butadiene rubber (SBR) as a binder, CNT as a conductive material, and carboxymethyl cellulose (CMC) as a thickener were used.

96.45 parts by weight of the negative electrode active material, 1.9 parts by weight of the binder, 0.5 parts by weight of the conductive material, and 1.15 parts by weight of the thickener were added to and mixed with 10 parts by weight of distilled water to prepare a negative electrode slurry. The negative electrode slurry was applied onto an 8 μm-thick copper foil (current collector) in a loading amount of 10 $mg/cm^2$ and then dried. In this case, a temperature of circulating air was 130° C. Subsequently, the current collector on which the negative electrode slurry had been applied was roll-pressed, dried in a vacuum oven set at 130° C. for 1 hour, and punched into a rectangle with a size of 15.2 $cm^2$, thereby producing a negative electrode including a negative electrode active material layer.

A nip pressure when the negative electrode active material was roll-pressed in a tandem manner was 4.5 Ton/cm.

Example 2: Preparation of Negative Electrode

A negative electrode was produced in the same manner as in Example 1, except that a mixture prepared by mixing the first uncoated artificial graphite particles and second uncoated artificial graphite particles of Example 1 in a weight ratio of 4:6 was used as a negative electrode active material.

The negative electrode active material had a BET specific surface area of 1.6 $m^2/g$. A nip pressure when the negative electrode active material was roll-pressed in a tandem manner was 5.5 Ton/cm.

Example 3: Preparation of Negative Electrode

A negative electrode was produced in the same manner as in Example 1, except that a mixture prepared by mixing the first uncoated artificial graphite particles and second uncoated artificial graphite particles of Example 1 in a weight ratio of 6:4 was used as a negative electrode active material.

The negative electrode active material had a BET specific surface area of 1.5 $m^2/g$. A nip pressure when the negative electrode active material was roll-pressed in a tandem manner was 6.5 Ton/cm.

Example 4: Preparation of Negative Electrode

First uncoated artificial graphite particles which are single particles having an average particle diameter ($D_{50}$) of 5 μm were prepared.

A negative electrode was produced in the same manner as in Example 1, except that the first uncoated artificial graphite particles were used instead of the first uncoated artificial graphite particles of Example 1.

The negative electrode active material had a BET specific surface area of 1.7 $m^2/g$. A nip pressure when the negative electrode active material was roll-pressed in a tandem manner was 7.5 Ton/cm.

Example 5: Preparation of Negative Electrode

First uncoated artificial graphite particles which are single particles having an average particle diameter ($D_{50}$) of 7 μm were prepared.

A negative electrode was produced in the same manner as in Example 1, except that the first uncoated artificial graphite particles were used instead of the first uncoated artificial graphite particles of Example 1.

The negative electrode active material had a BET specific surface area of 1.6 $m^2/g$. A nip pressure when the negative electrode active material was roll-pressed in a tandem manner was 6.5 Ton/cm.

Example 6: Preparation of Negative Electrode

Uncoated artificial graphite particles consisting of secondary particles (average particle diameter ($D_{50}$): 20 μm) formed by agglomerating a plurality of primary particles (average particle diameter ($D_{50}$): 6 μm) were prepared.

Specifically, the uncoated artificial graphite particles were prepared by pulverizing a coke raw material into coke with an average particle diameter ($D_{50}$) of 6 μm; mixing the pulverized coke and pitch to prepare an intermediate granulated in the form of a secondary particle; thermally treating the intermediate to induce graphitization and secondary granulation by slowly raising a temperature to 3,000° C., maintaining the temperature of 3,000° C. for 60 hours, and slowly lowering the temperature to room temperature; and adjusting an average particle diameter ($D_{50}$) of the secondary particles to 20 μm. In this case, the total thermal treatment time of the intermediate was 2 weeks.

A negative electrode was produced in the same manner as in Example 1, except that the uncoated artificial graphite particles were used as second uncoated artificial graphite particles instead of the second uncoated artificial graphite particles of Example 1.

The negative electrode active material had a BET specific surface area of 1.9 $m^2/g$. A nip pressure when the negative electrode active material was roll-pressed in a tandem manner was 5.5 Ton/cm.

Example 7: Preparation of Negative Electrode

Uncoated artificial graphite particles consisting of secondary particles (average particle diameter ($D_{50}$): 25 μm) formed by agglomerating a plurality of primary particles (average particle diameter ($D_{50}$): 6 μm) were prepared.

Specifically, the uncoated artificial graphite particles were prepared by pulverizing a coke raw material into coke with an average particle diameter ($D_{50}$) of 6 μm; mixing the pulverized coke and pitch to prepare an intermediate granulated in the form of a secondary particle; thermally treating the intermediate to induce graphitization and secondary granulation by slowly raising a temperature to 3,000° C., maintaining the temperature of 3,000° C. for 60 hours, and slowly lowering the temperature to room temperature; and adjusting an average particle diameter ($D_{50}$) of the secondary particles to 25 μm. In this case, the total thermal treatment time of the intermediate was 2 weeks.

A negative electrode was produced in the same manner as in Example 1, except that the uncoated artificial graphite particles were used as second uncoated artificial graphite particles instead of the second uncoated artificial graphite particles of Example 1.

The negative electrode active material had a BET specific surface area of 1.6 $m^2/g$. A nip pressure when the negative electrode active material was roll-pressed in a tandem manner was 5.5 Ton/cm.

Comparative Example 1: Preparation of Negative Electrode

First uncoated artificial graphite particles which are single particles having an average particle diameter ($D_{50}$) of 4 μm were prepared.

A negative electrode was produced in the same manner as in Example 1, except that the first uncoated artificial graphite particles were used instead of the first uncoated artificial graphite particles of Example 1.

The negative electrode active material had a BET specific surface area of 1.5 $m^2/g$. A nip pressure when the negative electrode active material was roll-pressed in a tandem manner was 9.5 Ton/cm.

Comparative Example 2: Preparation of Negative Electrode

First uncoated artificial graphite particles which are single particles having an average particle diameter ($D_{50}$) of 8 μm were prepared.

A negative electrode was produced in the same manner as in Example 1, except that the first uncoated artificial graphite particles were used instead of the first uncoated artificial graphite particles of Example 1.

The negative electrode active material had a BET specific surface area of 1.6 m$^2$/g. A nip pressure when the negative electrode active material was roll-pressed in a tandem manner was 8.5 Ton/cm.

Comparative Example 3: Preparation of Negative Electrode

Uncoated artificial graphite particles consisting of secondary particles (average particle diameter (D$_{50}$): 19 μm) formed by agglomerating a plurality of primary particles (average particle diameter (D$_{50}$): 8 μm) were prepared.

Specifically, the uncoated artificial graphite particles were prepared by pulverizing a coke raw material into coke with an average particle diameter (D$_{50}$) of 8 μm; mixing the pulverized coke and pitch to prepare an intermediate granulated in the form of a secondary particle; thermally treating the intermediate to induce graphitization and secondary granulation by slowly raising a temperature to 3,000° C., maintaining the temperature of 3,000° C. for 60 hours, and slowly lowering the temperature to room temperature; and adjusting an average particle diameter (D$_{50}$) of the secondary particles to 19 μm. In this case, the total thermal treatment time of the intermediate was 2 weeks.

A negative electrode was produced in the same manner as in Example 1, except that the uncoated artificial graphite particles were used as second uncoated artificial graphite particles instead of the second uncoated artificial graphite particles of Example 1.

The negative electrode active material had a BET specific surface area of 1.7 m$^2$/g. A nip pressure when the negative electrode active material was roll-pressed in a tandem manner was 9.5 Ton/cm.

Comparative Example 4: Preparation of Negative Electrode

Uncoated artificial graphite particles consisting of secondary particles (average particle diameter (D$_{50}$): 26 μm) formed by agglomerating a plurality of primary particles (average particle diameter (D$_{50}$): 8 μm) were prepared.

Specifically, the uncoated artificial graphite particles were prepared by pulverizing a coke raw material into coke with an average particle diameter (D$_{50}$) of 6 μm; mixing the pulverized coke and pitch to prepare an intermediate granulated in the form of a secondary particle; thermally treating the intermediate to induce graphitization and secondary granulation by slowly raising a temperature to 3,000° C., maintaining the temperature of 3,000° C. for 60 hours, and slowly lowering the temperature to room temperature; and adjusting an average particle diameter (D$_{50}$) of the secondary particles to 26 μm. In this case, the total thermal treatment time of the intermediate was 2 weeks.

A negative electrode was produced in the same manner as in Example 1, except that the uncoated artificial graphite particles were used as second uncoated artificial graphite particles instead of the second uncoated artificial graphite particles of Example 1.

The negative electrode active material had a BET specific surface area of 1.5 m$^2$/g. A nip pressure when the negative electrode active material was roll-pressed in a tandem manner was 8.5 Ton/cm.

Comparative Example 5: Preparation of Negative Electrode

A negative electrode was produced in the same manner as in Example 1, except that a mixture prepared by mixing the first uncoated artificial graphite particles and second uncoated artificial graphite particles of Example 1 in a weight ratio of 3:7 was used as a negative electrode active material.

The negative electrode active material had a BET specific surface area of 1.8 m$^2$/g. A nip pressure when the negative electrode active material was roll-pressed in a tandem manner was 10.5 Ton/cm.

Comparative Example 6: Preparation of Negative Electrode

A negative electrode was produced in the same manner as in Example 1, except that a mixture prepared by mixing the first uncoated artificial graphite particles and second uncoated artificial graphite particles of Example 1 in a weight ratio of 7:3 was used as a negative electrode active material.

The negative electrode active material had a BET specific surface area of 1.7 m$^2$/g. A nip pressure when the negative electrode active material was roll-pressed in a tandem manner was 11.5 Ton/cm.

Comparative Example 7: Preparation of Negative Electrode

First uncoated artificial graphite particles which are single particles having an average particle diameter (D$_{50}$) of 9 μm were prepared.

Second uncoated artificial graphite particles consisting of secondary particles (average particle diameter (D$_{50}$): 17.5 μm) formed by agglomerating a plurality of primary particles (average particle diameter (D$_{50}$): 4 μm) were prepared.

Specifically, the second uncoated artificial graphite particles were prepared by pulverizing a coke raw material into coke with an average particle diameter (D$_{50}$) of 4 μm; mixing the pulverized coke and pitch to prepare an intermediate granulated in the form of a secondary particle; thermally treating the intermediate to induce graphitization and secondary granulation by slowly raising a temperature to 3,000° C., maintaining the temperature of 3,000° C. for 60 hours, and slowly lowering the temperature to room temperature; and adjusting an average particle diameter (D$_{50}$) of the secondary particles to 17.5 μm. In this case, the total thermal treatment time of the intermediate was 2 weeks.

A negative electrode was produced in the same manner as in Example 1, except that a mixture prepared by mixing the first uncoated artificial graphite particles and the second uncoated artificial graphite particles in a weight ratio of 3:7 was used as a negative electrode active material.

The negative electrode active material had a BET specific surface area of 1.5 m$^2$/g. A nip pressure when the negative electrode active material was roll-pressed in a tandem manner was 5.5 Ton/cm.

Comparative Example 8: Preparation of Negative Electrode 90 parts by weight of the first uncoated artificial graphite particles of Example 1 was mixed with 10 parts by weight of pitch, and the mixture was thermally treated at 1,200° °

15

C. for 10 hours to prepare soft carbon-coated artificial graphite particles (average particle diameter ($D_{50}$): 6.5 μm).

A negative electrode was produced in the same manner as in Example 1, except that a mixture prepared by mixing the soft carbon-coated artificial graphite particles and the second uncoated artificial graphite particles of Example 1 in a weight ratio of 3:7 was used a negative electrode active material.

The negative electrode active material had a BET specific surface area of 1.1 m²/g. A nip pressure when the negative electrode active material was roll-pressed in a tandem manner was 6.5 Ton/cm.

Comparative Example 9: Preparation of Negative Electrode

A negative electrode was produced in the same manner as in Example 1, except that only the second uncoated artificial graphite particles of Example 1 were used as a negative electrode active material.

The negative electrode active material had a BET specific surface area of 0.9 m²/g. A nip pressure when the negative electrode active material was roll-pressed in a tandem manner was 7.5 Ton/cm.

Comparative Example 10: Preparation of Negative Electrode 90 parts by weight of the second uncoated artificial graphite particles of Example 1 was mixed with 10 parts by weight of pitch, and the mixture was thermally treated at 1,200° ° C. for 10 hours to prepare soft carbon-coated artificial graphite particles (average particle diameter ($D_{50}$): 23 μm).

A negative electrode was produced in the same manner as in Example 1, except that the soft carbon-coated artificial graphite particles were used as a negative electrode active material.

The negative electrode active material had a BET specific surface area of 0.8 m²/g. A nip pressure when the negative electrode active material was roll-pressed in a tandem manner was 10.5 Ton/cm.

Comparative Example 11: Preparation of Negative Electrode

A negative electrode was produced in the same manner as in Example 1, except that only the first uncoated artificial graphite particles of Example 1 were used as a negative electrode active material.

The negative electrode active material had a BET specific surface area of 1.2 m²/g. A nip pressure when the negative electrode active material was roll-pressed in a tandem manner was 11.5 Ton/cm.

Comparative Example 12: Preparation of Negative Electrode

A negative electrode was produced in the same manner as in Example 1, except that natural graphite (POSCO CHEMICAL, PAS-C3B) was used as a negative electrode active material.

The secondary particles present in the natural graphite had an average particle diameter ($D_{50}$) of 22.5 μm, a BET specific surface area was 2.9 m²/g, and a nip pressure when the negative electrode active material was roll-pressed in a tandem manner was 9.5 Ton/cm.

TABLE 1

| | Negative electrode active material | | | | | | |
|---|---|---|---|---|---|---|---|
| | First artificial graphite particle | | Second artificial graphite particle | | | Weight ratio of first artificial graphite particle and second artificial graphite particle | BET specific surface area of negative electrode active material (m²/g) |
| | Coating | Average particle diameter ($D_{50}$) (um) | Coating | Average particle diameter of primary particles ($D_{50}$) (um) | Average particle diameter of secondary particles ($D_{50}$) (um) | | |
| Example 1 | X | 6 | X | 8 | 22.5 | 5:5 | 1.5 |
| Example 2 | X | 6 | X | 8 | 22.5 | 4:6 | 1.6 |
| Example 3 | X | 6 | X | 8 | 22.5 | 6:4 | 1.5 |
| Example 4 | X | 5 | X | 8 | 22.5 | 5:5 | 1.7 |
| Example 5 | X | 7 | X | 8 | 22.5 | 5:5 | 1.6 |
| Example 6 | X | 6 | X | 6 | 20 | 5:5 | 1.9 |
| Example 7 | X | 6 | X | 6 | 25 | 5:5 | 1.6 |
| Comparative Example 1 | X | 4 | X | 8 | 22.5 | 5:5 | 1.5 |
| Comparative Example 2 | X | 8 | X | 8 | 22.5 | 5:5 | 1.6 |
| Comparative Example 3 | X | 6 | X | 8 | 19 | 5:5 | 1.7 |
| Comparative Example 4 | X | 6 | X | 8 | 26 | 5:5 | 1.5 |
| Comparative Example 5 | X | 6 | X | 8 | 22.5 | 3:7 | 1.8 |
| Comparative Example 6 | X | 6 | X | 8 | 22.5 | 7:3 | 1.7 |
| Comparative Example 7 | X | 9 | X | 4 | 17.5 | 3:7 | 1.5 |
| Comparative Example 8 | O | 6.5 | X | 8 | 22.5 | 5:5 | 1.1 |

TABLE 1-continued

| | First artificial graphite particle | | Second artificial graphite particle | | | Weight ratio of first artificial graphite particle and second artificial graphite particle | BET specific surface area of negative electrode active material $(m^2/g)$ |
|---|---|---|---|---|---|---|---|
| | Coating | Average particle diameter $(D_{50})$ (um) | Coating | Average particle diameter of primary particles $(D_{50})$ (um) | Average particle diameter of secondary particles $(D_{50})$ (um) | | |
| Comparative Example 9 | — | — | X | 8 | 22.5 | 0:10 | 0.9 |
| Comparative Example 10 | X | 6 | ○ | 8 | 23 | 5:5 | 0.8 |
| Comparative Example 11 | X | 6 | — | — | — | 10:0 | 1.2 |

Preparation Example

Batteries were produced using the negative electrodes of Examples 1 to 7 and Comparative Examples 1 to 12 as follows.

LCO as a positive electrode active material, a carbon black-based conductive material, and PVDF powder as a binder were mixed in a weight ratio of 92:2:6 in a N-methyl-2 pyrrolidone solvent to prepare a positive electrode slurry.

The prepared positive electrode slurry was applied onto a 20 μm-thick positive electrode current collector so that a loading amount $(mg/cm^2)$ was 23.4 mg per unit area, dried in a vacuum oven set at 130° C. for 1 hour, and roll-pressed at a pressure of 15 MPa while passing through rollers heated at 80° C., thereby producing a positive electrode with a final thickness (current collector+active material layer) of 72.5 μm.

A porous polyethylene separator was interposed between each of the negative electrodes produced in Examples 1 to 7 and Comparative Examples 1 to 12 and the positive electrode, a battery was assembled in a stacking manner, and an electrolyte solution (ethylene carbonate (EC)/ethyl methyl carbonate (EMC)=1:4 (volume ratio), lithium hexafluorophosphate ($LiPF_6$ 1 mole), and vinylidene carbonate (VC) in an amount of 0.5 wt % based on the weight of the electrolyte solution) was injected into the assembled battery, thereby producing individual lithium secondary batteries.

EXPERIMENTAL EXAMPLES

Experimental Example 1: Evaluation of Energy Density of Battery

The energy density per volume of each of the negative electrodes of Examples 1 to 7 and Comparative Examples 1 to 12 was measured using a PNE charger/discharger (PNE Solution). Results thereof are shown in Table 2 below.

Experimental Example 2: Evaluation of Lifetime Characteristics of Battery

The produced battery was charged and discharged by setting a charging range from SOC 0% to SOC 100% and performing the $1^{st}$ cycle at a current rate of 0.1 C, the $2^{nd}$ cycle at a current rate of 0.2 C, and the $3^{rd}$ to 100th cycles at 0.5 C, and then the charging performance of the battery was calculated by the following Equation 1.

Results thereof are shown in Table 2 below.

$$\text{Charging performance (\%)} = [\text{Charge capacity after } 100^{th} \text{ cycle/Initial charge capacity}] \times 100 \qquad \text{[Equation 1]}$$

Experimental Example 3: Evaluation of Pore Resistance of Negative Electrode

Each of the negative electrodes of Examples 1 to 7 and Comparative Examples 1 to 12 was used as both a working electrode and a counter electrode, and a polyethylene separator was interposed between the working electrode and the counter electrode to prepare an electrode assembly. An electrolyte solution, which was prepared by dissolving 1 M $LiPF_6$ in a solvent obtained by mixing ethylene carbonate (EC) and diethylene carbonate (EMC) in a volume ratio of 1:4, was injected into the electrode assembly to produce a symmetric cell.

The impedance of the symmetric cell was measured in a frequency range of 106 Hz to 0.05 Hz using an electrochemical impedance analyzer, electrolyte resistance and pore resistance were separated, and pore resistance was measured. Results thereof are shown in the following Table 2.

TABLE 2

| | Energy density (Wh/L) | Charging performance (%) | Pore resistance (ohm) |
|---|---|---|---|
| Example 1 | 810 | 95 | 7 |
| Example 2 | 800 | 93 | 8 |
| Example 3 | 780 | 94 | 8 |
| Example 4 | 770 | 92 | 9 |
| Example 5 | 790 | 91 | 8 |
| Example 6 | 760 | 93 | 7 |
| Example 7 | 775 | 92 | 8 |
| Comparative Example 1 | 740 | 85 | 10 |
| Comparative Example 2 | 735 | 84 | 12 |
| Comparative Example 3 | 725 | 82 | 11 |
| Comparative Example 4 | 715 | 80 | 14 |
| Comparative Example 5 | 720 | 79 | 15 |
| Comparative Example 6 | 710 | 76 | 14 |

TABLE 2-continued

| | Energy density (Wh/L) | Charging performance (%) | Pore resistance (ohm) |
|---|---|---|---|
| Comparative Example 7 | 710 | 75 | 17 |
| Comparative Example 8 | 680 | 72 | 18 |
| Comparative Example 9 | 690 | 73 | 20 |
| Comparative Example 10 | 640 | 71 | 21 |
| Comparative Example 11 | 600 | 72 | 19 |
| Comparative Example 12 | 670 | 70 | 18 |

Referring to Table 2, it can be confirmed that the negative electrodes of Examples 1 to 7 according to the present invention exhibited high energy density compared to the negative electrodes of Comparative Examples 1 to 12. This is because, since the negative electrodes of Examples 1 to 7 comprises the negative electrode active material including uncoated artificial graphite particles which are single particles having an average particle diameter ($D_{50}$) of 5 μm to 7 μm and uncoated artificial graphite particles which are secondary particles formed by agglomerating a plurality of primary particles and having an average particle diameter ($D_{50}$) of 20 μm to 25 μm in a specific weight ratio, a low nip pressure is measured in roll-pressing in a tandem manner, and thus the electrode is smoothly roll-pressed even with relatively low force, thereby achieving a thin electrode.

In addition, it can be confirmed that the batteries including the negative electrodes of Examples 1 to 7 according to the present invention exhibited remarkably excellent charging performance compared to the batteries including the negative electrodes of Comparative Examples.

Additionally, it can be confirmed that the negative electrodes according to the present invention exhibited a low pore resistance of 9 ohm or less. Accordingly, it can be seen that the negative electrodes according to the present invention are capable of maintaining charging characteristics at high levels by lowering resistance to electrolyte diffusion while sufficiently maintaining the structure of the electrode.

The invention claimed is:

1. A negative electrode, comprising:
a current collector; and
a negative electrode active material layer on the current collector,
wherein the negative electrode active material layer comprises a negative electrode active material, wherein the negative electrode active material comprises first uncoated artificial graphite particles and second uncoated artificial graphite particles in a weight ratio of 4:6 to 6:4,
wherein the first uncoated artificial graphite particles are single particles having an average particle diameter ($D_{50}$) of 5 μm to 7 μm,
wherein the second uncoated artificial graphite particles are secondary particles formed by agglomerating a plurality of primary particles and the second uncoated artificial graphite particles have an average particle diameter ($D_{50}$) of 20 μm to 25 μm, and
wherein the first uncoated artificial graphite particles and the plurality of primary particles are different particles.

2. The negative electrode of claim 1, wherein the negative electrode active material consists of the first uncoated artificial graphite particles and the second uncoated artificial graphite particles.

3. The negative electrode of claim 1, wherein the secondary particles are formed by agglomerating the plurality of primary particles having an average particle diameter ($D_{50}$) of 7 μm to 9 μm.

4. The negative electrode of claim 1, wherein the negative electrode active material has a tap density ranging from 1.00 g/cc to 1.20 g/cc.

5. The negative electrode of claim 1, wherein the negative electrode active material has a BET specific surface area ranging from 1.0 m²/g to 2.5 m²/g.

6. The negative electrode of claim 1, wherein the negative electrode active material layer has a pore volume ranging from 10 cm³/g to 20 cm³/g.

7. The negative electrode of claim 1, wherein the negative electrode active material is present in an amount of 90 wt % to 99 wt % in the negative electrode active material layer.

8. The negative electrode of claim 1, wherein the negative electrode active material layer further comprises a conductive material, and
wherein the conductive material is present in an amount of 0.1 wt % to 1.0 wt % in the negative electrode active material layer.

9. The negative electrode of claim 8, wherein the conductive material comprises at least one selected from the group consisting of carbon black and carbon nanotubes.

10. The negative electrode of claim 1, wherein the negative electrode has a pore resistance of 9 ohm or less.

11. A secondary battery, comprising:
the negative electrode according to claim 1;
a positive electrode;
a separator interposed between the negative electrode and the positive electrode; and
an electrolyte injected into the secondary battery.

* * * * *